United States Patent [19]

Eisemann et al.

[11] 4,280,705
[45] Jul. 28, 1981

[54] RECORD PLAYER

[75] Inventors: Kurt Eisemann; Jürgen Montag, both of Berlin, Fed. Rep. of Germany

[73] Assignee: U.S. Philips Corporation, New York, N.Y.

[21] Appl. No.: 90,365

[22] Filed: Nov. 1, 1979

[30] Foreign Application Priority Data

Nov. 8, 1978 [DE] Fed. Rep. of Germany ....... 2848393

[51] Int. Cl.³ ............................................. G11B 17/06
[52] U.S. Cl. .................................... 369/233; 369/244
[58] Field of Search .................. 274/9 R, 15 R, 13 R, 274/23 R, 1 L

[56] References Cited

U.S. PATENT DOCUMENTS 3,398,963 8/1968 Wersche ................................ 274/23
3,854,730 12/1974 Takizawa ........................... 274/15 R
4,108,444 8/1978 Takizawa ........................ 274/1 L X

FOREIGN PATENT DOCUMENTS 250694 7/1948 Switzerland .............................. 274/23

Primary Examiner—Harry N. Haroian
Attorney, Agent, or Firm—David R. Treacy

[57] ABSTRACT

In a record player an overload coupling is arranged between a command disk and a pick-up arm controlled by the disk. The coupling comprises two coupling members which are pivotable relative to each other out of a neutral position about an axis, which members each comprise a guide which is concentrically curved around the axis. Viewed parallel to the axis, the guides coincide in the neutral position. A continuous helical spring, whose ends bear against end portions of the guides in the neutral position, is slid over the guides.

4 Claims, 6 Drawing Figures

RECORD PLAYER

BACKGROUND OF THE INVENTION

The invention relates to a record player comprising a pick-up arm adapted to be controlled by a command disk and, an overload coupling arranged between the pick-up arm and the command disk; and more particularly to such a player in which the coupling comprises two coupling members which are pivotable relative to each other about a common axis against spring force starting from a neutral position, a first of the coupling members cooperating with the command disk and the second coupling member cooperating with the pick-up arm.

A record player of this type is known from German Patent No. 1,248,332, to which U.S. Pat. No. 3,398,963 corresponds. If in such an automatically operating record player the control program, which is governed by the command disk, is disturbed by an incorrect external manipulation, the two coupling members of the overload coupling can pivot relative to each other about the common axis starting from the neutral position and the cooperation between the command disk and the first coupling member on the one hand and the pick-up arm and the second coupling member on the other hand ceases. When the incorrect operating condition has terminated, the two coupling members can return to the neutral position under spring force. As the spring used in this known construction is disposed eccentrically relative to the common axis, the coupling members are more easily centered relative to each other in a first direction than in a second opposite direction.

SUMMARY OF THE INVENTION

It is the object of the invention so to construct the overload coupling in such a record player that in both directions the coupling members are centered relative to each other in a similar way.

According to the invention each coupling member comprises a guide which is concentrically curved about the common axis, the guides of the coupling members coinciding in the neutral position viewed parallel to the axis, and the coupling includes a continuous helical spring slid over the guides, in the neutral position respective ends of the spring bearing against end portions of the guides. Thus, in order to remedy an incorrect operation of the pick-up arm it is irrelevant whether the instantaneous position of the pick-up arm relative to the position dictated by the command disk deviates in a first or in a second direction. When the undesired operating condition has ceased mutual centering is effected in a similar way both in respect of speed and accuracy in both cases.

In a suitable embodiment of the invention the guide of each coupling member is constituted by two tabs which are concentrically disposed around the axis, which tabs extend towards each other from the points when they are connected to the coupling member and which are spaced from each other at their free ends. This construction provides a reliably operating overload coupling, which can simply be assembled.

Preferably, the connection of each tab to the coupling member constitutes an abutment for one end of the helical spring.

In a preferred embodiment of the invention each coupling member is constituted by a plate-shaped lever and the tabs are disposed in an opening formed in the lever. This provides a cheap and compact construction.

The invention will be described in more detail with reference to the accompanying drawing.

DESCRIPTION OF THE PREFERRED EMBODIMENTS

Figure 1:
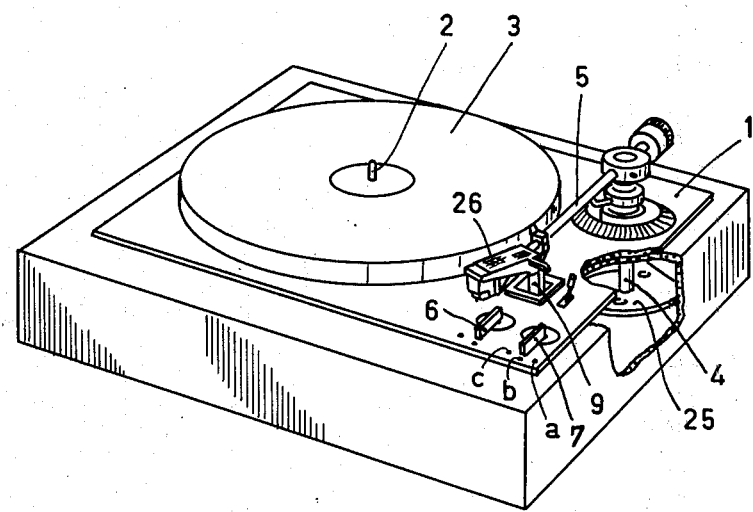
FIG. 1 is an elevation of a record player in accordance with the invention.

The record player shown in FIG. 1 comprises a frame 1, which accommodates the usual parts, such as a turntable spindle 2 with a turntable 3 and a pick-up arm spindle 4 to which a pick-up arm 5 is rigidly connected. Furthermore, the frame 1 accommodates a number of controls used for controlling the record player, such as a control 6 for starting the record player and a control 7 for selecting the turntable speed and simultaneously setting the position to which the pick-up arm 5 is automatically moved, in a manner to be described hereinafter, by a command disk 8 which is journalled in the frame 1. In FIG. 1 a position a of the control 7 corresponds to a speed of 45 r.p.m. of the turntable 3 and a starting position of the pick-up arm 5 for playing a record of 17-cm diameter, and a position b corresponds to a speed of 33 r.p.m. and a pick-up arm starting position for a 30-cm record. In a position c of the control 7 the pick-up arm 5 is automatically moved to a rest or zero position on a support 9 provided on the frame 1. After the setting of the control 7 has been selected the command disk 8 is moved by a coupling, not shown, between the control 7 and the command disk 8. This coupling is of conventional construction and falls beyond the scope of the invention.

Figure 2:
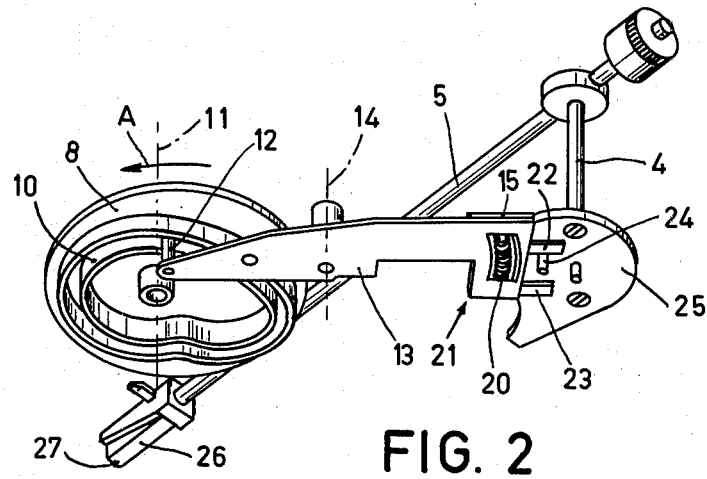
FIG. 2 is an elevation of relevant parts of the record player of FIG. 1.

For automatically controlling the pick-up arm 5 the command disk 8 has a control groove 10, which has a profile which is curved around an axis of rotation 11 in such a way that by a rotation of the disk 8 about the axis 11 in the direction of arrow A in FIG. 2, because of the setting of the control 7 a carrier pin 12, which is situated in the groove 10, is moved about the axis of rotation 11 to a position which is defined by the setting of the control 7.

Figure 3:
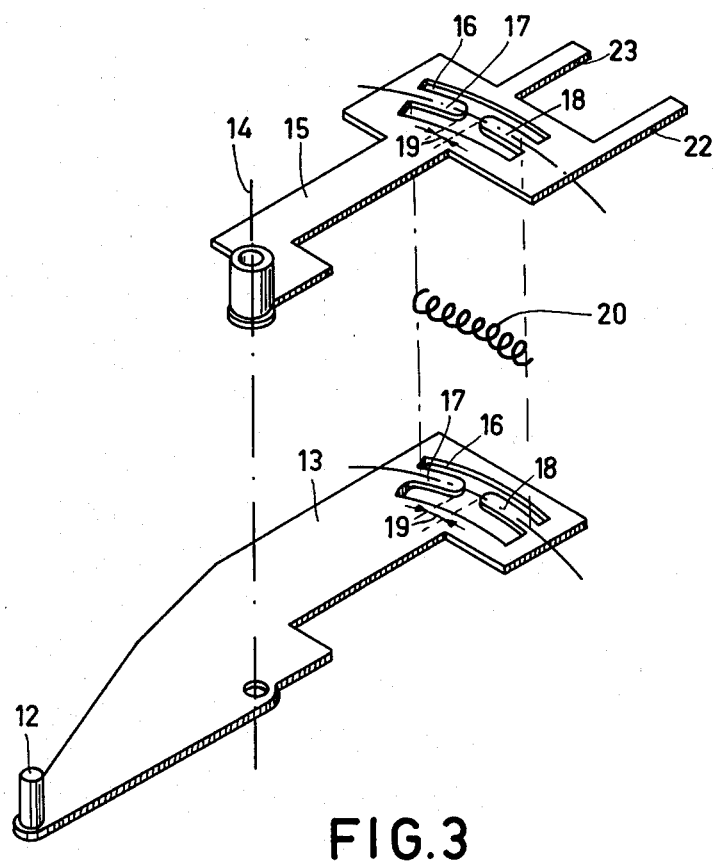
FIG. 3 is an exploded view of an overload coupling of the record player of FIG. 1.

The carrier pin 12 is secured near an end of a plate-shaped lever 13 which cooperates with the command disk 8, which lever is mounted so as to be pivotable relative to the frame 1 about a pivoting axis 14. In a manner as illustrated in the FIGS. 2, 3 and 4 a plate-shaped lever 15 is arranged over the lever 13, which lever 15 is pivotable about the axis 14 which is common to the lever 13, which lever 15 extends from the pivoting axis 14 in the direction of the end of the lever 13 which is remote from the pin 12. In both levers 13 and 15 openings 16 are formed near the ends which are remote from the pin 12, which openings are identical for the levers 13 and 15 and are shaped identically relative to the common axis 14. In each opening 16 two tabs 17 and 18 of the lever are situated, which tabs are disposed concentrically relative to the axis 14 and extend towards each other from the points where they are connected to the levers 13 and 15 and whose free ends are spaced from each other by a distance 19. A continuous helical spring 20 has been slid around the pairs of tabs 17 and 18 of the levers 13 and 15. Thus, the tabs 17 and 18 of each lever 13 or 15 respectively constitute a guide for the helical spring, which guide is concentrically curved relative to the axis 14, the respective ends of the spring 20 bearing against abutments constituted by the connection of each tab 17 or 18 to the associated lever.

It is to be noted that in the embodiment shown the helical spring 20 can simply be mounted through the clearance between the free ends of the pairs of tabs 17 and 18. However, it is also possible to use a continuous guide which extends between the connections of the associated levers, which guide in order to mount the spring 20 can be mounted separately, for example by means of a screw connection.

Figure 4:
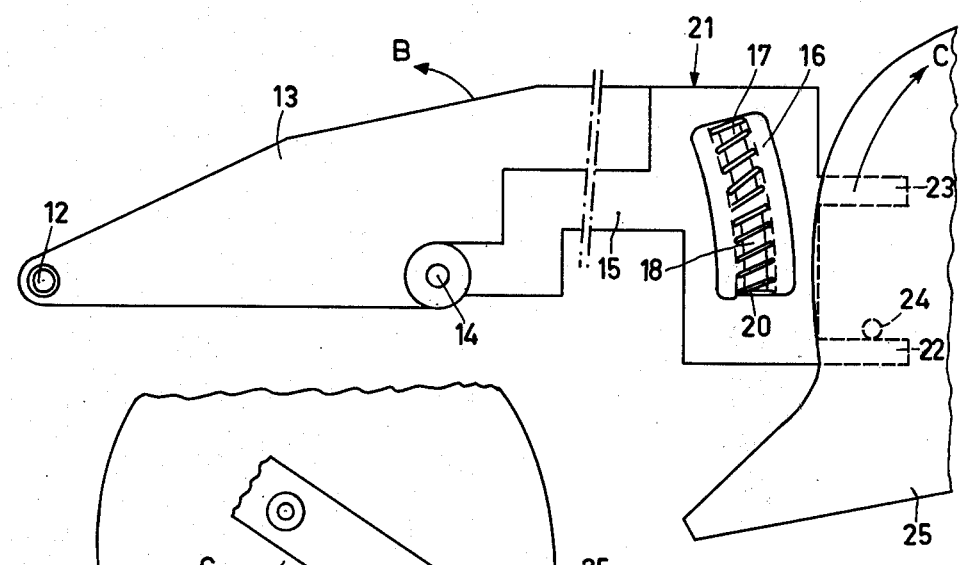
FIG. 4 is an elevation of the overload coupling of the record player of FIG. 1, the coupling members being in a mutually centered neutral position.

As is shown in FIG. 4, the levers 13 and 15 constitute a first and a second coupling member of an overload coupling 21, the helical spring 20 ensuring that the levers 13 and 15 are centered. Viewed parallel to the axis 14 the pairs of tabs 17 and 18 coincide in a centered neutral position of the coupling 21, so that the respective ends of the spring 20 bear against the two connections of the superimposed tabs 17 and 18.

At the end which is remote from the axis 14 the lever 15 comprises limbs 22 and 23 which constitute a fork. These limbs constitute stops, between which a carrier pin 24, which is mounted on a pick-up arm lever 25, can move. As the pick-up arm lever 25 is rigidly connected to the pick-up arm spindle 4 in a manner shown in FIG. 2 and thus to the pick-up arm 5, the pick-up arm 5 is pivotable between positions defined by the limbs 22 and 23 and can co-operate with the lever 15 after the pin 24 has moved against one of the limbs 22 and 23.

During operation, in a manner described above, the carrier pin 12, depending on the setting of the control 7, is moved in the control groove 10. If the control 7 has for example been set to position a, this results in the levers 13 and 15 being pivoted about the ais 14 in the direction of an arrow B (see FIG. 4), in order to move the pick-up arm 5 with a pick-up element 26 comprising a stylus 27 from the zero position to the starting position for a 17-cm diameter record via the limb 22 by a pivotal movement in accordance with an arrow C. However, if owing to an incorrect external manipulation, the control program for the pick-up arm, defined by the control groove 10, is disturbed during the pivotal movement of the levers, for example in that the pick-up arm 5 is blocked in the 30-cm diameter position, the lever 15 is not pivoted further than the position shown in FIG. 5. However, the command disk 8 pivots the lever 13 further in the direction of the arrow B, so that the levers 13 and 15 are pivoted relative to each other out of the neutral position, the helical spring 20 being compressed. If the pick-up arm 5 is no longer blocked when the incorrect operating condition ceases, the levers 13 and 15 are again centered in the neutral position of FIG. 4 under the influence of the spring 20 and the pick-up arm 5 can move further to the end position defined by the control groove 10, in the present example the 17-cm starting position.

Figure 6:
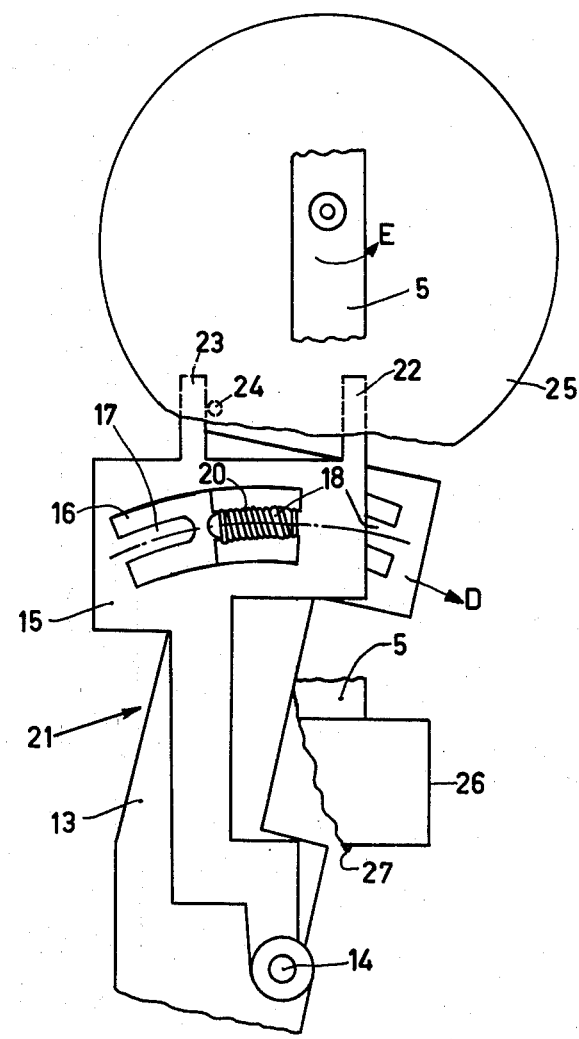
FIG. 6 is an elevation of the overload coupling of the record player of FIG. 1, the coupling members being pivoted in a second direction opposite to that of FIG. 5.

In the example of FIG. 6 the stylus 27 of the pick-up element 26 runs in the lead-out groove of a record placed on the turntable 3, in which position of the pick-up arm 5 the command disk automatically starts the control program for returning the pick-up arm to the support 9. The situation shown can also be initiated by setting control 7 to position c. Owing to the movement of the control groove 10 the levers 13 and 15 tend to pivot in the direction of an arrow D in FIG. 6. However, in the present example the pick-up arm 5 is blocked in the position shown because of an incorrection manipulation so that, because the carrier pin 24 is positioned against the limb 23, the lever 15 cannot be pivoted further than the position shown in FIG. 6. As the command disk 8 pivots the lever 13 further in the direction of the arrow D, the two levers 13 and 15 also make a pivotal movement relative to each other in the present example.

Figure 5:
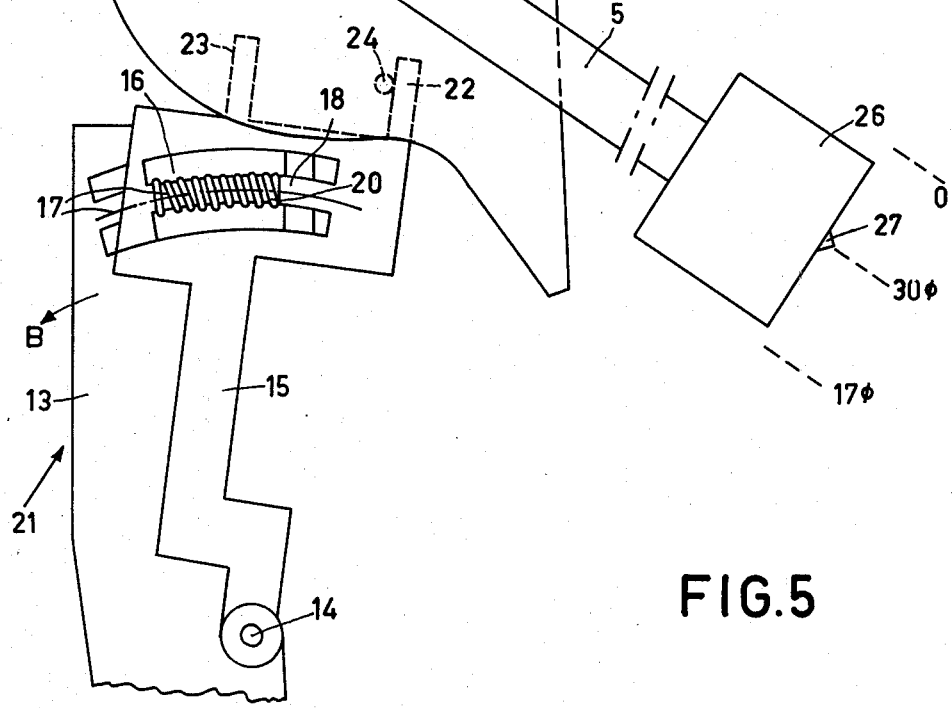
FIG. 5 is an elevation of the overload coupling of the record player of FIG. 1, the coupling members being mutually pivoted in a first direction.

However, in this case the two levers are pivoted relative to each other in a direction which is opposite to that of the pivotal movement in the example of FIG. 5. Due to the construction of the overload coupling 21 the levers 13 and 15 in the example of FIG. 6, when the pick-up arm is no longer blocked, are centered relative to each other under the influence of the helical spring 20 in a similar way as the levers in the example of FIG. 5, both in respect of speed and accuracy.

After the levers 13 and 15 have been centered, the levers are pivoted further in accordance with the arrow D in FIG. 6 and the pick-up arm 5 is moved to the zero position in the direction of an arrow E via the limb 23.

When in the record player in accordance with the invention, the pick-up arm is no longer blocked, the overload coupling is re-centered with the same speed and accuracy and pick-up arm control is continued in a manner as described above, regardless of the direction of a pick-up arm control cycle which is in progress. In this way a record player is obtained with a pick-up arm control protection which operates accurately and rapidly under all conditions.

What is claimed is:

1. A record player comprising a pick-up arm (5), a command disk (8) for controlling the position of the pick-up arm, an overload coupling (21) arranged between the pick-up arm and the command disk, which coupling comprises two coupling members (13, 15) which are pivotable relative to each other about a common axis (14) against spring force starting from a neutral position, a first of said coupling members (13) cooperating with the command disk and the second coupling member (15) cooperating with the pick-up arm, characterized in that each coupling member (13, 15) comprises a guide (17, 18) which is concentrically curved about the common axis, in the neutral position the guides of the coupling members coinciding as viewed parallel to the axis (14), and the overload coupling further comprising a continuous helical spring (20) slid over the guides, in the neutral position respective ends of the springs bearing against end portions of the guides.

2. A record player as claimed in claim 1, characterized in that the guide of each coupling member (13, 15) is constituted by two tabs (17, 18) which are concentrically disposed around the axis, which tabs extend towards each other from the points where they are connected to the coupling member and which are spaced from each other at their free ends.

3. A record player as claimed in claim 2, characterized in that the connection of each tab (17, 18) to the coupling member (13, 15) constitutes an abutment for one end of the helical spring (20).

4. A record player as claimed in claim 2 or 3, characterized in that each coupling member is constituted by a plate-shaped lever (13, 15) and the tabs (17, 18) are disposed in an opening (16) formed in the lever.

* * * * *